May 27, 1969   P. P. MIANO   3,445,882
CASTER WHEEL
Filed Nov. 1, 1966

Paul P. Miano
INVENTOR.

BY Clarence A. O'Brien
and Harvey B. Jacobson
Attorneys

United States Patent Office 3,445,882
Patented May 27, 1969

3,445,882
CASTER WHEEL
Paul P. Miano, Box 246, Garyville, La. 70051
Filed Nov. 1, 1966, Ser. No. 591,170
Int. Cl. B60b *33/08;* B65 *29/00*
U.S. Cl. 16—21                          4 Claims

ABSTRACT OF THE DISCLOSURE

A body defining a downwardly opening recess partially closed by a lower inwardly projecting annular flange and including a cylindrical support member captively journaled in the recess by roller radial thrust bearing means interposed between the support member and the walls of the recess and annular thrust bearing means disposed between the upper end of the support member and the closed upper end of the recess. The lower end of the cylindrical support member includes downwardly opening and aligned diametrically opposed semicylindrical recesses and a wheel including opposite side outwardly projecting stub axle portions is rotatably received within the lower end of the cylindrical support member with its stub axle portions journaled in the semicylindrical recesses and captively retained therein by means of the annular lower end wall or flange of the body above which the lower peripheral portions of the stub axle portions are at least slight spaced.

---

This invention relates to a novel and useful caster wheel and more specifically to a caster wheel which has been designed to afford silent operation as well as to have a high load carrying capacity. Further, the caster of the instant invention is constructed in a manner whereby it may be readily secured to any suitable object which is to be rolled from one location to another.

The main object of this invention is to provide an improved caster wheel assembly which will afford silent operation and which will have a high load carrying capacity.

Another object of this invention is to provide a caster wheel assembly that may be readily secured to substantially all types of furniture for support of the furniture therefrom in a manner whereby the furniture may be readily rolled from one location to another.

A still further object of this invention, in accordance with the preceding object, is to provide a caster wheel assembly which may have its exteriorly visible surface portion thereof constructed of various materials and contoured as desired while still retaining the basic structural features of the caster wheel thereby adapting the caster wheel for securement to different types of furniture with the caster wheel being readily adaptable to conform to various types of furniture.

A final object of this invention to be specifically enumerated herein is to provide a caster wheel in accordance with the preceding objects which will conform to conventional forms of manufacture, be of simple construction and easy to install so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 3:
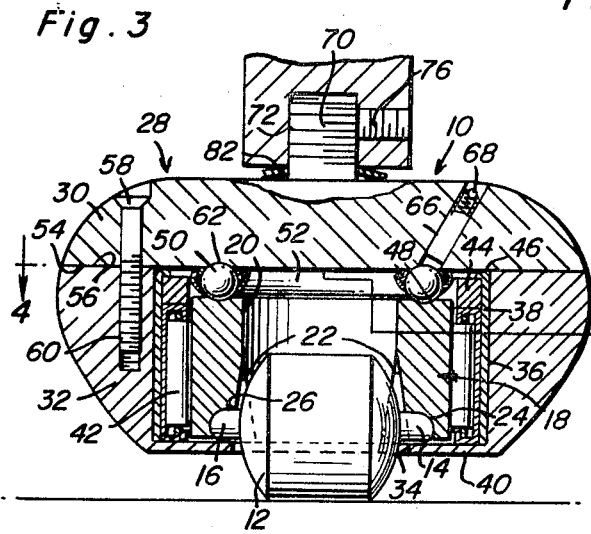
FIGURE 3 is an enlarged vertical sectional view taken substantially upon the plane indicated by the section line 3—3 of FIGURE 1.
Figure 4:
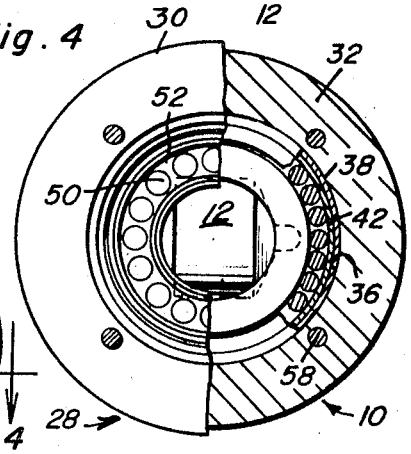
FIGURE 4 is a horizontal sectional view taken substantially upon the plane indicated by the section line 4—4 of FIGURE 3.

Referring now more specifically to the drawings the numeral 10 generally designates the caster wheel assembly of the instant invention. The assembly 10 includes a wheel 12 including opposite side laterally outwardly projecting and axially aligned axle portions 14 and 16. The assembly 10 further includes a support member generally referred to by the reference numeral 18 and which is generally cylindrical in configuration. The support member 18 defines a centrally disposed bore or cavity 20 extending vertically therethrough and diametrically opposite side portions of the lower end of the bore 20 are relieved as at 22. Further, the same diametrically opposite portions of the lower end of the support member 18 include axially aligned downwardly opening generally semicylindrical recesses 24 and 26 whose adjacent ends open into the bore 20. The wheel 12 has its opposite side axle portions 14 and 16 rotatably journaled in the recesses 24 and 26, respectively, and it may be seen from FIGURE 3 of the drawings that the free ends of the axle portions 14 and 26 and the corresponding ends of the recesses 24 and 26 are rounded so as to define mating thrust bearing surfaces.

The assembly 10 includes a body generally referred to by the reference numeral 28 comprising upper and lower body sections 30 and 32. The lower section 30 has an upstanding bore 34 formed therethrough including a diametrically enlarged counterbore 36 at its upper end in which a bearing sleeve 38 is snugly received. The shoulder 40 defined by the bottom end of the counterbore 36 defines an axially thin partial bottom wall for the lower section 32 through which the bore 34 opens. A roller bearing assembly 42 is snugly received within the bearing sleeve 38 and abutted against the shoulder 40. The support member 18 includes cylindrical outer surfaces and is snugly received within the roller bearing assembly 42 with the axle portions 14 and 16 journalled in the recesses 24 and 26 and having their lower peripheral portions disposed to an abutting engagement with the shoulder 40, the latter thereby serving to captively retain the wheel 12 within the support member 18 independent of the latters upward displacement relative to the roller bearing assembly 42.

A retaining ring 44 is disposed on top of the roller bearing assembly 42 and the upper marginal edge portion 46 of the bearing sleeve 38 is crimped over the retaining ring 44.

The upper end face of the cylindrical support member 18 is provided with an upwardly opening circular groove 48 in which the ball elements 50 of a ball bearing assembly 52 are disposed.

The upper section 30 of the body 28 includes a lower surface 54 which mates with the upper surface 56 of the lower section 32 and threaded fasteners 58 are secured through the upper section 30 at points spaced circumferentially thereabout and are threadedly engaged in suitable threaded bores 60 provided therefor in the lower section 32 of the body 28. The fasteners 58 may of course be tightened so as to draw the upper and lower sections 30 and 32 together and from FIGURE 3 of the drawings it may be seen that the portions of the undersurface 54 of the upper section 30 opposing the ball bearing assembly 52 have a downwardly opening circular groove 62 formed therein in which the upper peripheral portion of the ball elements 50 are disposed. Accordingly, it may be seen that the ball bearing assembly 52 serves as a thrust bearing assembly.

The upper section 30 includes an oil passage 66 opening upwardly through the top of the upper section 30 and downwardly into the groove 62. The passage 66 has a normally closed and manually openable valve assembly 68 disposed therein and it may therefore be seen that the oil passage 66 and valve assembly 68 may be utilized to lubricate the bearing assembly 52. Further, since at least a portion of any lubricant flowing downwardly from the oil passage 66 into the groove 62 will also be transmitted to the groove 68 and thus the upper surface of the support member 18 immediately outwardly of the groove 48, a certain portion of any lubricating fluid passed downwardly through the oil passage 66 will also flow downwardly along the outer surface of the support member 18 so as to lubricate the roller bearing assembly 42.

The upper section 30 of the body 28 includes an externally threaded upwardly projecting mounting shank portion 70 and the latter is threadedly engaged in a downwardly opening blind bore 72 formed in a foot member 74. The foot member 74 includes a setscrew 76 engageable with the mounting shank portion 70 to secure the latter in adjusted positions longitudinally of the blind bore 72 and the upper end of the foot member 74 is provided with a mounting flange portion 78 suitably apertured as at 80 for securement to any suitable structure 82 such as a piece of furniture which is to be supported from the caster wheel assembly 10. Of course, a suitable star washer 82 or the like is disposed on the mounting shank portion 70 between the lower end of the foot member 74 and the upper surface of the upper section 30.

Figure 1:
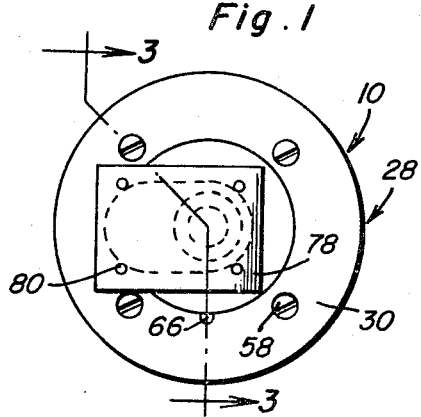
FIGURE 1 is a top plan view of the caster wheel of the instant invention.
Figure 5:
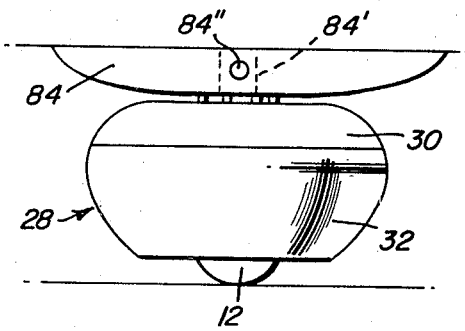
FIGURE 5 is a side elevational view of the caster wheel similar to that of FIGURE 2 but with the caster wheel provided with a modfified mount for securing the caster wheel to a piece of furniture.
Figure 2:
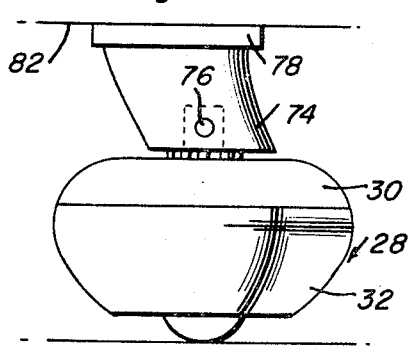
FIGURE 2 is a side elevational view of the assemblage illustrated in FIGURE 1.
Figure 6:
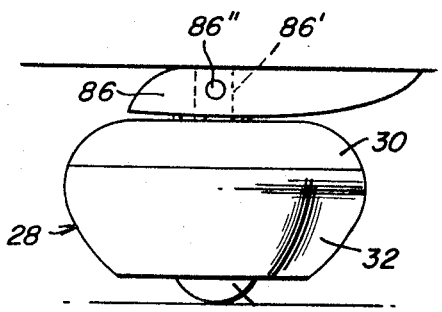
FIGURE 6 is a side elevational view of the caster wheel similar to FIGURES 2 and 5 but illustrating a third form of mount for securing the caster wheel to a piece of furniture.

With attention now directed more specifically to FIGURES 5 and 6 of the drawings there may be seen a modified form of foot member 84 illustrated in FIGURE 5 and a still further modified form of foot member 86 illustrated in FIGURE 5. The foot members 84 and 86 include bores 84' and 86' corresponding to the bore 72 and setscrews 84" and 86" corresponding to the setscrews 76. Of course, the foot members 84 and 86 may also be provided with suitable mounting apertures similar to apertures or bores 80 for the purposes securing the foot members 84 and 86 to suitable articles which are to be supported from the associated caster wheel assemblies. In addition, since the shank portion 70 is releasably held in adjusted rotated position in the bore 72 by means of the setscrew 76 and therefore also in longitudinally adjusted position, the body 28 of the assembly 10 is locked against rotation relative to the foot member 74 and therefore also the structure 82 and against vertical shifting relative to the structure 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:
1. A caster wheel assembly comprising, a body including upper and lower sections, an upstanding bore formed through said lower section and including an upwardly opening counterbore terminating downwardly at a level spaced slightly above the lower end of said bore, an upstanding generally cylindrical support member loosely disposed in said counterbore, roller radial thrust bearing means interposed between the outer surfaces of said support member and the opposing surfaces of said counterbore, said cylindrical support member defining a centrally disposed downwardly opening recess and including diametric opposite lower wall portions thereof provided with aligned downwardly opening semicylindrical recesses, a wheel including opposite side outwardly projecting stub axle portions disposed in said recess with its stub axle portions rotatably received in said aligned recesses and spaced slightly above and held captive in said recesses by the lower end face of said counterbore and with at least the lower periphery of said wheel projecting downwardly below said lower section through said bore, means securing the upper section of said body over the lower section thereof, thrust bearing means disposed between the upper end of said support member and the opposing surface portions of said upper section, and means carried by said upper section adapting the latter for stationary support from a lower portion of an article to be supported from said assembly such as a piece of furniture.

2. The combination of claim 1 including a retaining ring releasably secured in the upper end of said recess captively retaining said roller radial thrust bearing means in said recess.

3. The combination of claim 1 wherein said upper section includes a lubricant passage formed therein having one end opening upwardly through an upper portion of said upper section and its lower end opening downwardly in alignment with a predetermined area of said axial thrust bearing means.

4. The combination of claim 1 wherein said means adapted for securement to an article to be supported from said assembly includes a foot member adapted for securement to said article, said foot member including a downwardly opening bore, said upper section including an upwardly projecting mounting shank telescoped into and secured in adjusted axially shifted and rotated position in said bore.

References Cited
UNITED STATES PATENTS

| 957,480 | 5/1910 | Svenuig | 16—21 |
|---|---|---|---|
| 1,231,510 | 6/1917 | Edmonds | 16—21 |

FOREIGN PATENTS 21,950   1/1894   Great Britain.

BOBBY R. GAY, *Primary Examiner.*

DORIS L. TROUTMAN, *Assistant Examiner.*

U.S. Cl. X.R.

16—26